United States Patent [19]

Rosa et al.

[11] 4,210,860

[45] Jul. 1, 1980

[54] VAR GENERATOR WITH CURRENT SENSITIVE INDUCTANCE BREAK POINT

[75] Inventors: John Rosa, Penn Hills; Laszlo Gyugyi, Pittsburgh, both of Pa.

[73] Assignee: Westinghouse Electric Corp., Pittsburgh, Pa.

[21] Appl. No.: 942,838

[22] Filed: Sep. 15, 1978

[51] Int. Cl.[2] .................... H02J 3/18

[52] U.S. Cl. .................... 323/119

[58] Field of Search .................... 323/102, 105, 119

[56] References Cited

U.S. PATENT DOCUMENTS

| | | | |
|---|---|---|---|
| 2,606,966 | 8/1952 | Pawley | 323/119 X |
| 3,936,727 | 2/1976 | Kelly, Jr. et al. | 323/102 |
| 3,999,117 | 12/1976 | Gyugyi et al. | 323/119 |
| 4,104,576 | 8/1978 | Frank | 323/119 X |

*Primary Examiner*—William M. Shoop

*Attorney, Agent, or Firm*—M. J. Moran

[57] ABSTRACT

The static VAR generator of the fixed capacitor switch-controlled inductor type is taught. The inductive element has a break point in its inductive characteristic. That is, below a certain predetermined current, the inductance is one value and above the latter current the inductance is another value. This has the effect of providing a reduced value of inductive reactance above a certain inductive current level thus making it possible to significantly increase the inductive current above its normal range with a small increase of the switch conduction interval. In one case a saturable iron core reactor is utilized to achieve the break point and in another case two inductive elements are provided—one of which is controlled by a switch which places the latter inductor into circuit arrangement with the first at the time that the current exceeds the predetermined value.

17 Claims, 7 Drawing Figures

X
Y
Z
CONTROL
LOAD CURRENT SENSOR
LD
CC1
CC2
CC3
L1
L2
L3
TH12
TH23
TH31
a
b
c

VAR GENERATOR WITH CURRENT SENSITIVE INDUCTANCE BREAK POINT

BACKGROUND OF THE INVENTION

The subject matter of this invention relates generally to VAR generators and relates more specifically to VAR generators of the type employing fixed capacitors and controlled saturating reactors for complementary VAR generation.

It is known to make VAR generators by connecting a fixed capacitor and a continuously controlled inductor in parallel with each other across two lines of an electrical system to be regulated or compensated by the VAR generator. A suitable control system is provided for providing an output signal to the switch portion of the controlled inductor to establish a current conduction interval for the inductor. The conduction interval constitutes a controlled portion of a predetermined period of time, during which current is allowed to flow, thus generating an inductively reactive current which interacts with the fixed capacitively reactive current to produce a net reactive current which cooperates with the voltage across the lines to produce reactive power. The predetermined interval of time is usually one half cycle of the line voltage. Consequently, on a half cycle by half cycle basis, the conduction interval can be changed to provide differing amounts of reactive power as is determined is necessary by the calculating portion of the system. Systems of the previous type can be found in U.S. Pat. No. 3,936,727 issued Feb. 3, 1976 to F. W. Kelly, Jr. and G. R. E. Laison; and U.S. Pat. No. 3,999,117 issued Dec. 21, 1976 to L. Gyugyi et al. The latter patent is assigned to the assignee of the present invention. A number of considerations are related to the following variables: the inductance of the inductor, the conduction interval, the voltage overswing across the lines to be regulated, and reactive current harmonics. To be more specific, it has been found that if the voltage overswing is relatively large as may be the case where there are large transients in the system, the inductance of the controlled reactor must be chosen low enough so that at near maximum conduction interval the resulting inductive reactive current delivered is sufficient to reduce the voltage overswing to a desired level. This implies a significantly smaller conduction interval near normal voltage, which however introduces significant distortion into the compensating current due to the generation of harmonics including the fifth harmonic, for example. It would be advantageous therefore if a way could be found to utilize the inductive properties of the VAR generator to provide compensating reactive current for a wide range of voltage transients without necessitating narrow conduction intervals at near nominal voltage conditions.

SUMMARY OF THE INVENTION

In accordance with the invention, apparatus has been found for reactively compensating for the effects of load variation in an electrical system in which the voltage of the system to be compensated may swing over a wide range due to transient effects. In particular, in one embodiment of the invention a saturating iron core reactor is used as the inductor of the VAR generator. In that embodiment, if the compensating current stays below a predetermined break point level during the conduction interval, the reactor displays a relatively high inductance requiring a relatively wide conduction interval to provide the modest low distortion inductive reactive current needed at nearnominal voltages. The breakpoint level is selected to be somewhat higher than this current. If the required compensating current exceeds the predetermined break point level, with a small increase of the conduction interval the iron core inductor will saturate thus providing a new lower value of inductance which allows a significantly larger value of current to flow during the period of time that saturation is in effect thus providing significantly greater compensating current than would be available without saturation for the same conduction interval.

In another embodiment of the invention, a second switched inductor combination is connected in parallel with the first inductor and in series with the first switch. This switched inductor combination is then introduced into the circuit during the portion of the half cycle in question in which the net inductor current exceeds the predetermined value thus changing the net inductance of the VAR generator and providing the results mentioned previously.

BRIEF DESCRIPTION OF THE DRAWINGS

For a better understanding of the invention, reference may be had to the preferred embodiments thereof shown in the accompanying drawings, in which.

DESCRIPTION OF THE PREFERRED EMBODIMENT

Figure 1:
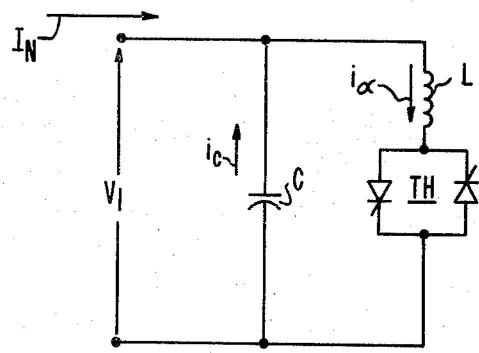
FIG. 1 shows a prior art, single phase, fixed capacitor switched inductor type VAR generator.
Figure 2:
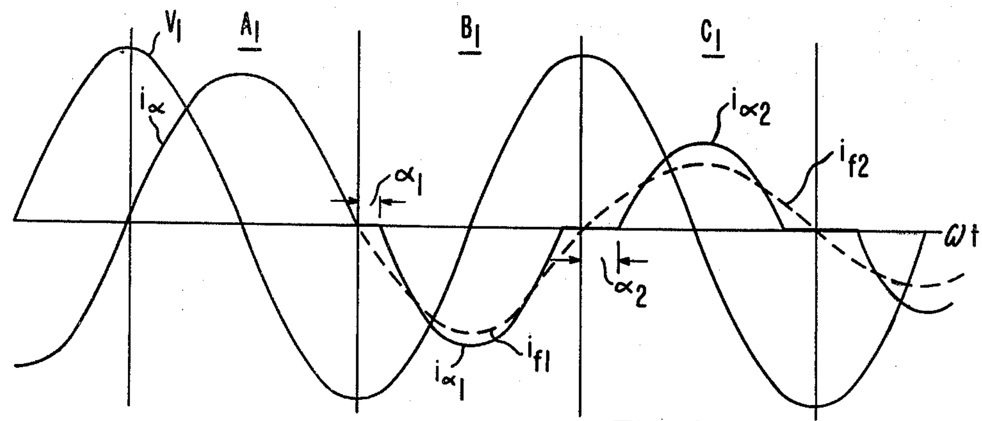
FIG. 2 shows a plot of voltage versus compensating current for the VAR generator of FIG. 1.

Referring now to the drawings and FIGS. 1 and 2 in particular, a prior art single phase VAR generator apparatus is shown. In this case a fixed capacitor C is interconnected with the series combination of a fixed inductor L and a bi-polar thyristor switch TH. Voltage $V_1$ is impressed across the parallel combination and an input current $I_N$ flows as a result thereof. A net component of capacitive current $i_C$ flows in the capacitor C and a net component of inductive current $i_\alpha$ flows in the inductor L. The magnitude of the capacitive current $i_C$ is a function of the voltage $v_1$ and the capacitance of the capacitive element C whereas the inductive current $i_\alpha$ is a function of the voltage $v_1$, the inductance of the inductive element L and the conduction interval of the thyristor switch TH. In FIG. 2 a plot of the voltage $V_1$ and the current $i_\alpha$ is shown. In portion $A_1$ of FIG. 2, the current $i_\alpha$ is produced by a 100% conduction interval for the thyristor switch TH. In portion $B_1$ an appropriate control (not shown) for the thyristor switch TH has phased back or limited the conduction interval by introducing a conduction delay or phase angle $\alpha_1$ so that the current $i_{\alpha 1}$ flows through the inductive element L. Current $i_{\alpha 1}$ has the fundamental component $i_{f1}$. In interval $C_1$ the phase back angle $\alpha_2$ is larger than the phase back angle $\alpha_1$, thus producing the inductor current $i_{\alpha 2}$ and limiting the fundamental component thereof $i_{f2}$ to an even lower value than is shown in $B_1$. In this manner the amount of inductive current available for interacting with the capacitive current $i_C$ can be changed by changing the phase back angle $\alpha_1$, $\alpha_2$, etc.

Figure 3:
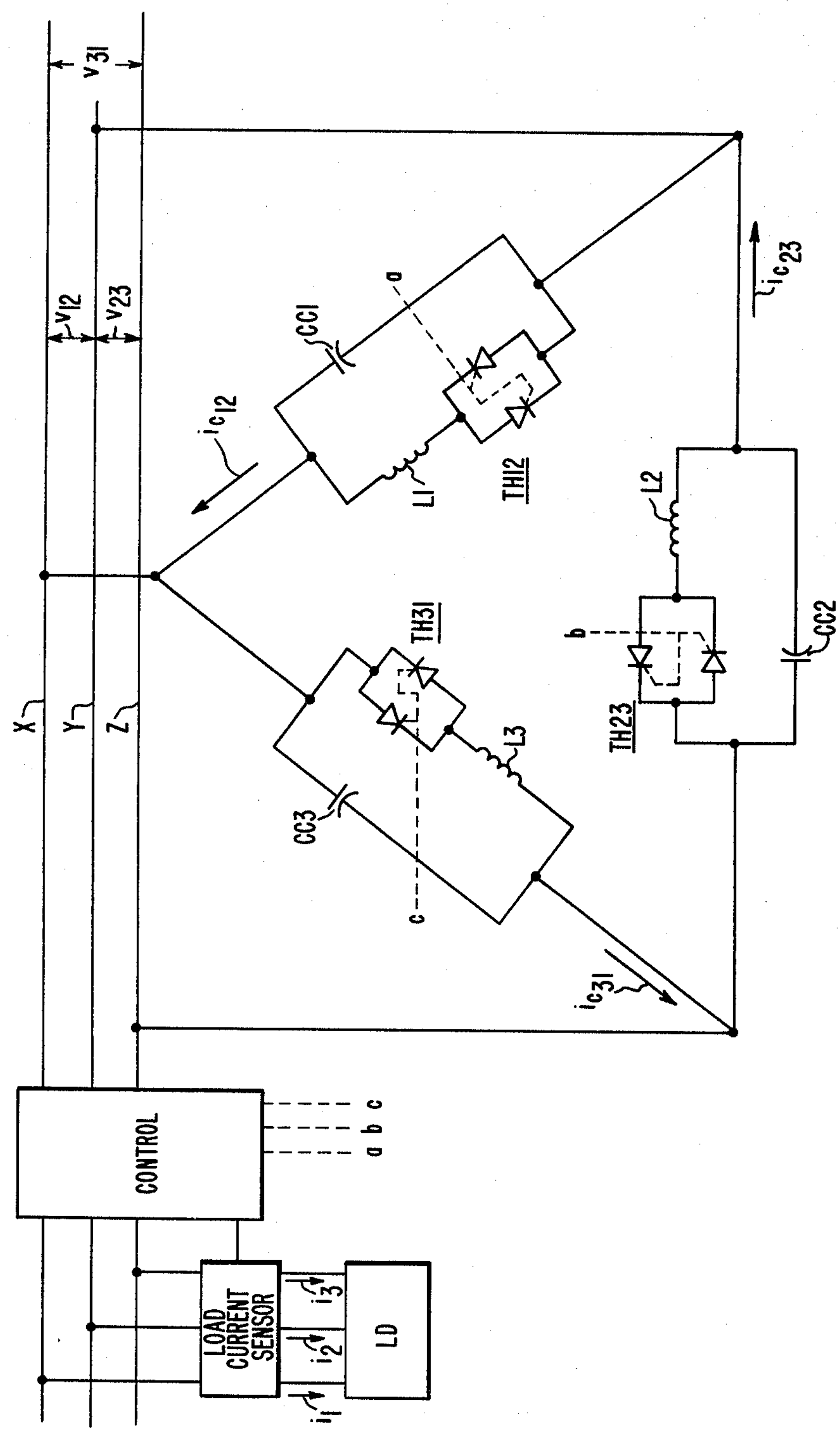
FIG. 3 shows a three phase prior art VAR generator circuit including a control system.

Referring now to FIG. 3, a prior art three phase VAR generator is shown. In this case the three phase system has voltages $v_{12}$, $v_{23}$ and $v_{31}$ impressed between the lines thereof. Interconnected with the electrical system is a load LD and a VAR generator which serves to compensate the reactive power consumption of the load. The control system of the VAR generator, CONTROL, senses the load currents $i_1$, $i_2$ and $i_3$ and the previously mentioned circuit voltages $v_{12}$, $v_{23}$ and $v_{31}$. Control signals a, b and c are provided to thyristor sets TH12, TH23 and TH31, respectively, for controlling the conduction interval of the respective thyristor switches in each half cycle of line voltage. The three thyristor switch sets are connected in Δ configuration between the lines X, Y and Z of the electrical system. To be more specific fixed capacitor CC1 is connected in parallel with the series combination of an inductive element L1 and the thyristor switch set TH12 to provide a compensating current $^{i}c_{12}$ in response to the signal a. This latter arrangement is interconnected across the lines X and Y of the electrical system. Likewise, the fixed capacitive element CC2 is connected in parallel with the series combination of an inductive element L2 and a thyristor switch set TH23 to provide the compensating current $^{i}c_{23}$ as a function of the signal b. This latter arrangement is connected between the Y and Z lines of the electrical system. Finally, the fixed capacitor element CC3 is connected in parallel with the series combination of an inductive element L3 and the thyristor switch set TH31 to provide the compensating reactive current $^{i}c_{31}$ between the lines X and Z of the electrical system. Consequently, it can be seen that as circuit variables such as voltages and current change in the electrical system, the control circuit predicts on a half cycle by half cycle basis the amount of reactive power (and thus current) which will be needed in the next half cycle for effective control and provides output signals a, b and c. This provides the appropriate conduction interval for the inductors L1, L2 and L3 to thus provide currents $^{i}c_{12}$, $^{i}c_{23}$ and $^{i}c_{31}$ which in turn generate the reactive compensating power.

Figure 4:
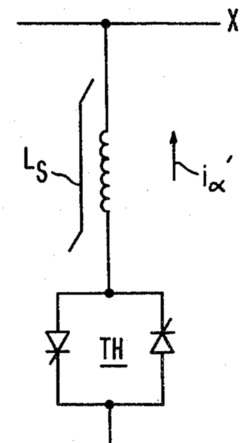
FIG. 4 shows a VAR generator branch with saturating inductor.

Referring now to FIG. 4, a new inductive VAR generator branch which includes a saturating inductor $L_S$ and a thyristor switch TH is shown for the circuit of FIG. 3. In this case current $i_\alpha'$ is conducted by the inductor $L_S$ during the conduction interval, that is when the switch TH is closed. If the current $i_\alpha'$ exceeds a predetermined value, the iron core of inductor or reactor $L_S$ saturates thus decreasing the inductance thereof, thus decreasing the inductive reactance of the branch shown in FIG. 4 thus allowing more current to flow therethrough than would normally flow, without saturation, based upon a given conductive interval and a given voltage across the parallel combination.

Figure 5:
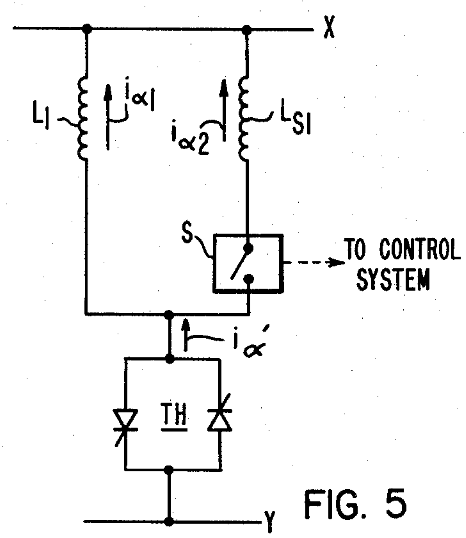
FIG. 5 shows a VAR generator branch with two inductors.

Referring now to FIG. 5 still another embodiment of the invention is shown in which a thyristor controlled inductor branch includes two inductors $L_1$ and $L_{S1}$, both of which may be of the air core type. Inductor $L_{S1}$ may be controlled by an electronic switch S which is interconnected with the control system CONTROL. During a conduction interval when the current $i_\alpha'$ is below a predetermined value, all of that current flows as inductive current $i_{\alpha 1}$ through the inductive element $L_1$. However, when the current $i_\alpha'$ exceeds the predetermined value, at some angle $\alpha_2$, the control system senses this and operates to close the electronic switch S thus introducing a second inductance $L_{S1}$ into the branch and causing a second component of inductive current $i_{\alpha 2}$ to flow. It can be seen that currents $i_{\alpha 1}$ and $i_{\alpha 2}$ combine to form the current $i_{\alpha'}$. Thus, during the interval when the switch S is closed the net reactance of the network drops thus introducing a significant increase in the current $i_\alpha'$ even though all other things generally remain equal.

Figure 6:
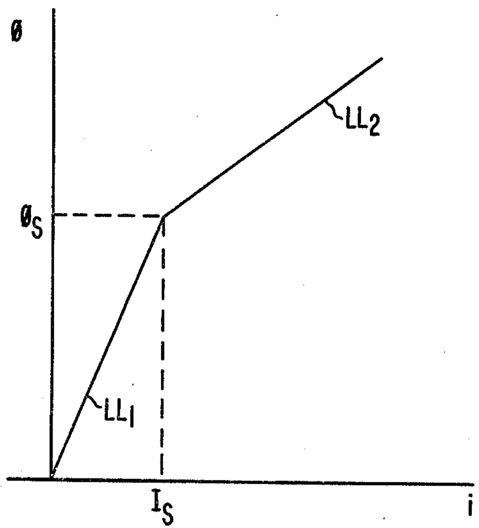
FIG. 6 shows a plot of inductance (with a well defined break point) for the apparatus of either FIG. 4 or FIG. 5.

Referring now to FIG. 6 a plot of current (i) versus flux ($\phi$) for the saturating reactor of FIG. 4 is shown. In this case, a break point saturating current is established and shown at ($i_S$, $\phi_S$). Beyond the point $\phi_S$ the saturating reactor is defined as being saturated. The plot of flux versus current for values of current below $i_S$ and values of flux below $\phi_S$ shows a first value of inductance $LL_1$ for the inductor $L_1$, which incidentally may be equal to the value of the inductance for the inductor $L_1$ shown in FIG. 5. However, after saturation occurs at $\phi_S$, the incremental inductance of the saturating iron core reactor $L_S$ changes to $LL_2$. This has the effect of permitting a higher reactive current flow and thus a larger inductive reactive compensation in the VAR generator without any other changes taking place. The graph of FIG. 6 displays the saturation in a somewhat idealized manner. In reality, with the available saturating core materials, saturation is not quite as abrupt and for a specific design this must be taken into account. The inductance vs. current relationship displayed in FIG. 6 may be converted to the one appropriate for the apparatus of FIG. 5 by removing the flux definitions for the vertical axis. In the case of FIG. 5, when the saturating or break point current $i_S$ is reached the second inductor $L_{S1}$ is switched into the circuit and combines with the first inductor $L_1$ to form a net inductance $LL_2$.

Figure 7:
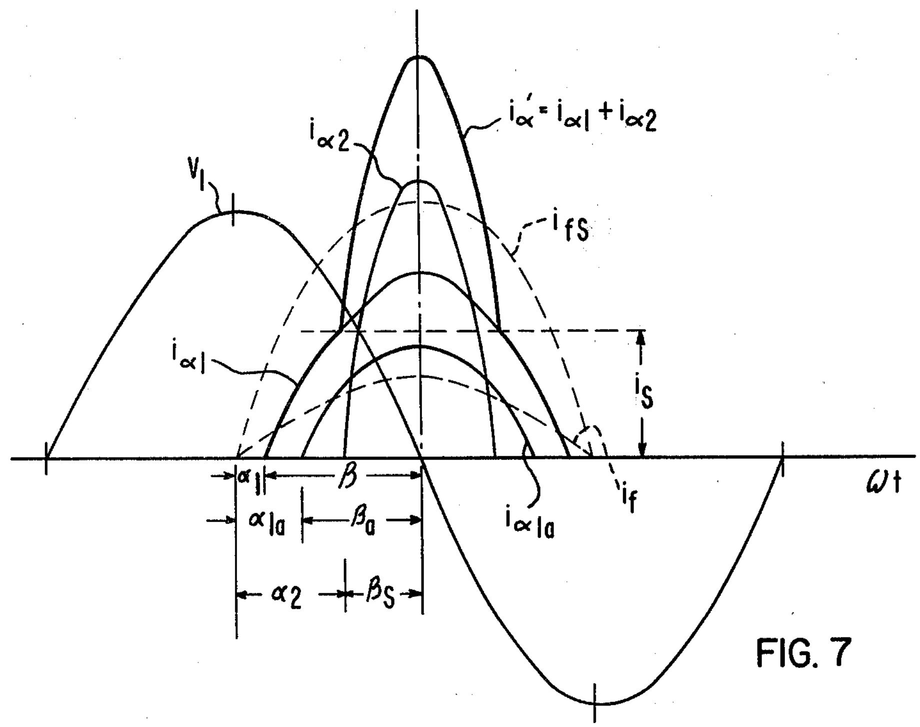
FIG. 7 shows a plot similar to that shown in FIG. 2 but for the apparatus of FIGS. 4 and 5.

Referring now to FIG. 7, a plot of the effects of the break point inductance concept is shown. In this case, the voltage $v_1$ is considered to be the voltage between the lines or the conductors of the branch in question. Current $i_S$ is determined to be the level at which the break point is established. A phase back angle $\alpha_1$ will produce a conduction interval $2\beta$ which will allow the current $i_{\alpha 1}$ to flow until the break point value $i_S$ is exceeded in which case a second component of current $i_{\alpha 2}$ is also provided either by the second inductor $L_{S1}$ of FIG. 5 or by saturation of the inductor $L_S$ of FIG. 4. The conduction interval for the current $i_{\alpha 2}$ is defined as $2\beta_S$; the current $i_{\alpha 2}$ and the current $i_{\alpha 1}$ combine or add to form a net current $i_\alpha''$ which has a fundamental component $i_{fS}$. This current may cooperate with the parallel connected capacitive current to produce a net reactive current which reacts with the voltage between the lines to produce a net volt amperes reactive (VAR's) sufficient to compensate for the effects of flicker or load variation or the like in the line voltage $v_1$ in a given half cycle. It is to be noted that if phase back angle $\alpha$ is large enough so that the current generated during the conduction interval never exceeds the break point value $i_S$ then the second inductor $L_{S1}$ of FIG. 5 will not be switched into the circuit or alternatively the saturating reactor $L_S$ of FIG. 4 will not saturate. This case is illustrated for phase back angle $\alpha_{1a}$, and corresponding conduction interval $2\beta_a$. In that case, the current $i_{\alpha 1a}$ flows producing a fundamental current $i_f$. It is to be noted that in this second situation a significantly smaller fundamental current is obtained with a relatively wide conductive interval and correspondingly low harmonic distortion. In a preferred embodiment of the invention, the below-break point inductance values are chosen to provide one per unit of reactive current at a relatively wide conduction angle and one per unit of line voltage, one per unit being defined as the inductance current required at nominal voltage. The break point current $i_S$ is selected to be somewhat larger than the peak of the one per unit current. Thus, in the normal zero to one per unit current operating range, the reactor $L_S$ (in the case of FIG. 4) displays a relatively high reactance. The above-break point inductance is selected such that once the current exceeds the $i_S$ level it is exposed to a much lower inductance and in full conduction at a specified high transient voltage it is sufficient to compensate for the effects of transients in the system. Thus, with the normal operating range stretched to higher conduction intervals, the harmonic content of the phase controlled current is significantly reduced. It has been found by experiment that one per unit of current can be obtained with a 122° conduction interval resulting in a fifth harmonic of 7.62% as compared with a linear air core reactor where one per unit of current can be obtained with a conduction angle of 88° resulting in an 18.22% fifth harmonic. In both instances the required maximum current, obtained at 180° conduction and 1.4 per unit voltage is 8.2 per unit.

It is to be understood with respect to the embodiments of the invention shown herein that the concepts are not limited to a static switching circuit. It is also to be understood that the concepts utilized herein may be adapted for use on single phase or multi-phase electrical systems at any convenient frequency. It is also to be understood that interconnection in a multi-phase system may be Δ or Y or any other accepted interconnection arrangement. It is also to be understood that in some embodiments of the invention, two break points and three inductive values may be utilized or more if practical.

The apparatus taught herein has many advantages. One advantage lies in the fact that in one embodiment of the invention, a single saturable reactor may be utilized to provide compensating reactive current over a wide range of voltage transients thus eliminating the necessity for multiple inductors and for diminishing the harmful effects of significant values of harmonics. In another embodiment of the invention, multiple inductors are used and provide the advantage of eliminating the harmful effect of significant multiple harmonics.

What we claim as our invention is:

1. A VAR generator of the type which is connected to an electrical system for the purpose of supplying reactive power thereto, comprising:

(a) control means interconnected with said electrical system for determining the amount of reactive power that is to be provided to said electrical system during a given period of time and for providing an output signal related thereto; and (b) switch controlled inductive means connected to said control means to receive said output signal therefrom and connected to said electrical system for delivering said reactive power thereto as a function of a control means determined conduction interval during said given period of time, said inductive means having a first value of inductance for values of reactive current conducted therethrough which are equal to or less than a predetermined amount, said inductive means having a second value of inductance for values of reactive current conducted therethrough which are greater than said predetermined amount, said reactive power being related to said reactive current, the amount of reactive power thus delivered to said electrical system for a given conductive interval being dependent upon whether said reactive current exceeds said predetermined amount or not during said given conduction interval.

2. The combination as claimed in claim 1 wherein said given period of time comprises the time span of one half cycle of alternating electrical voltage between two conductors of said electrical system.

3. The combination as claimed in claim 2 wherein said alternating electrical voltage has a frequency of 60 Hz.

4. The combination as claimed in claim 2 wherein said alternating electrical voltage has a frequency of 50 Hz.

5. The combination as claimed in claim 1 wherein the switch of said switch controlled inductive means comprises a thyristor, the control terminal of which is interconnected with said control means for this controlling said conductive interval as a function of said output signal.

6. The combination as claimed in claim 1 wherein said inductive means comprises a saturating reactor, said first value of inductance occurring when said reactor is not saturated and said second value of inductance occuring when said reactor is saturated.

7. The combination as claimed in claim 6 wherein said given period of time comprises the time span of one half cycle of alternating electrical voltage between two conductors of said electrical system.

8. The combination as claimed in claim 7 wherein said alternating electrical voltage has a frequency of 60 Hz.

9. The combination as claimed in claim 7 wherein said alternating electrical voltage has a frequency of 50 Hz.

10. The combination as claimed in claim 6 wherein the switch of said switch controlled inductive means comprises a thyristor, the control terminal of which is interconnected with said control means for thus controlling said conduction interval as a function of said output signal.

11. The combination as claimed in claim 10 wherein said inductive means is interconnected in a parallel circuit relationship which a fixed capacitive means wherein the controllable reactive current of said inductive means interacts with fixed reactive current from said capacitive means to provide a net reactive current to said electrical system during said period of time.

12. The combination as claimed in claim 1 wherein said inductive means comprises two inductors switchable into and out of circuit relationship with one another by additional switch means for thus providing said first and second inductances.

13. The combination as claimed in claim 12 wherein said given period of time comprises the time span of one half cycle of alternating electrical voltage between two conductors of said electrical system.

14. The combination as claimed in claim 13 wherein said alternating electrical voltage has a frequency of 60 Hz.

15. The combination as claimed in claim 13 wherein said alternating electrical voltage has a frequency of 50 Hz.

16. The combination as claimed in claim 12 wherein the switch of said switch controlled inductive means comprises a thyristor, the control terminal of which is interconnected with said control means for thus controlling said conduction interval as a function of said output signal.

17. The combination as claimed in claim 16 wherein said inductive means is interconnected in parallel circuit relationship which a fixed capacitive means wherein the controllable reactive current of said inductive means interacts with fixed reactive current from said capacitive means to provide a net reactive current to said electrical system during said period of time.

* * * * *